No. 875,677. PATENTED DEC. 31, 1907.
C. W. SLEEPER.
APPARATUS FOR SOLDERING CANS.
APPLICATION FILED SEPT. 22, 1906.

5 SHEETS—SHEET 1.

Witnesses
R. A. Bowell
R. W. Flint

Inventor
Charles W. Sleeper
by A. P. Greeley
Atty

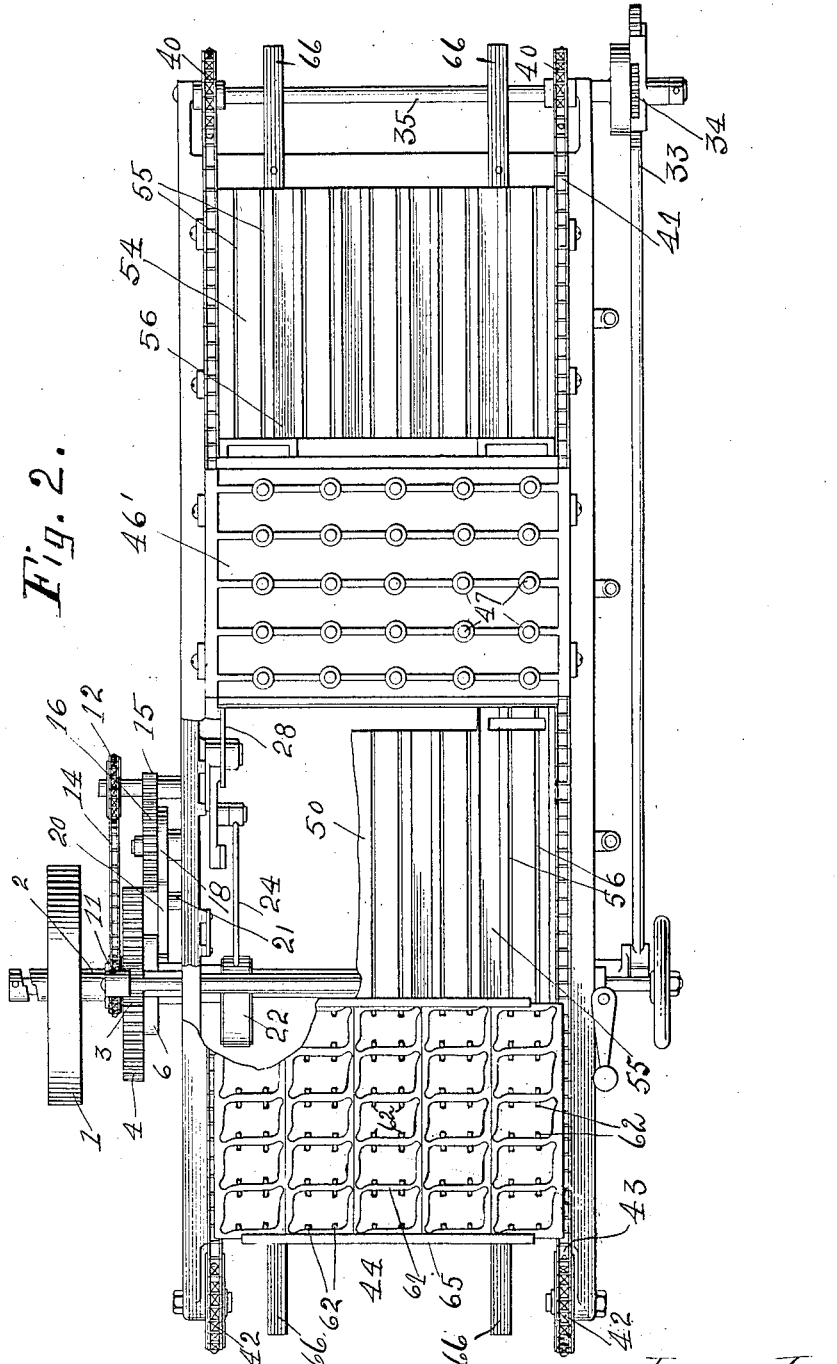

No. 875,677. PATENTED DEC. 31, 1907.
C. W. SLEEPER.
APPARATUS FOR SOLDERING CANS.
APPLICATION FILED SEPT. 22, 1906.
5 SHEETS—SHEET 3.
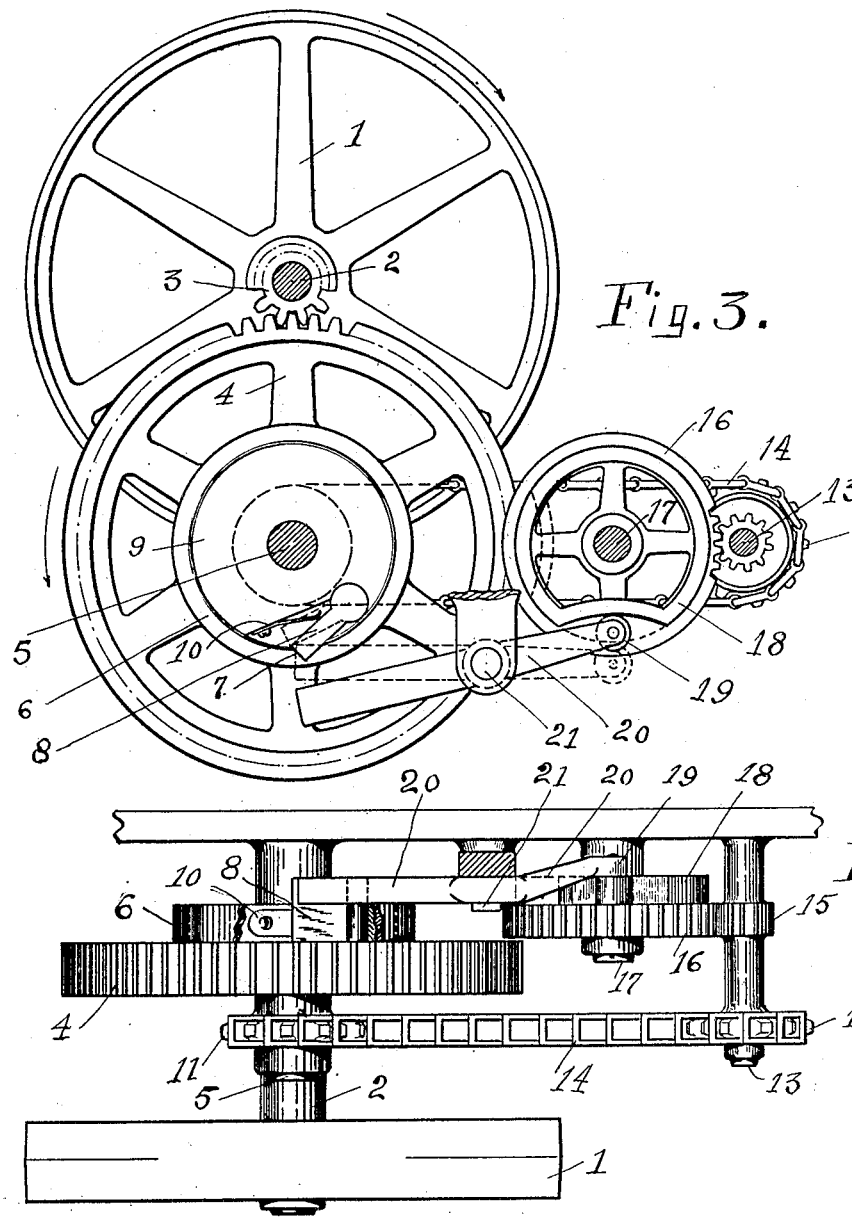
Witnesses.
R. A. Bawell
R. W. Flint
Inventor
Charles W. Sleeper
by A. P. Greeley
Atty

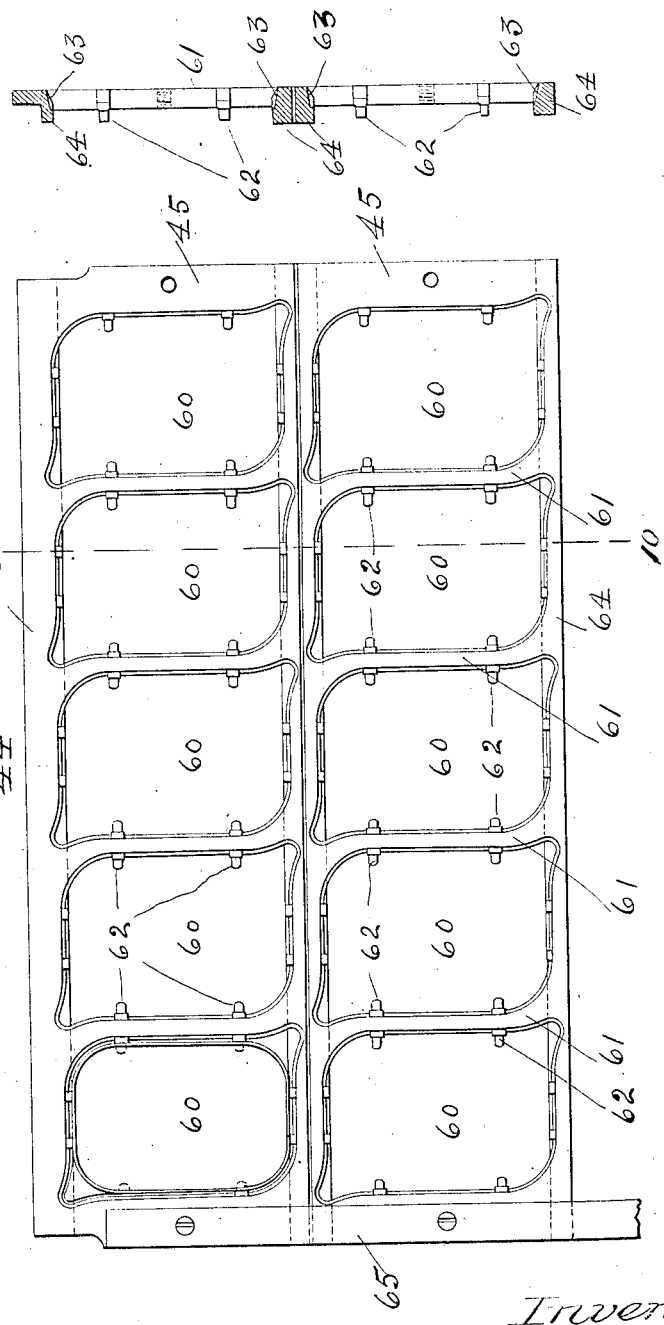

UNITED STATES PATENT OFFICE.

CHARLES W. SLEEPER, OF LANCASTER, NEW HAMPSHIRE, ASSIGNOR TO THE INDEPENDENT CANNING COMPANY, OF EASTPORT, MAINE.

APPARATUS FOR SOLDERING CANS.

No. 875,677.

Specification of Letters Patent.

Patented Dec. 31, 1907.

Application filed September 22, 1906. Serial No. 335,740.

*To all whom it may concern:*

Be it known that I, CHARLES W. SLEEPER, a subject of the King of Great Britain and Ireland, residing at Lancaster, in the county of Coos, State of New Hampshire, have invented certain new and useful Improvements in Apparatus for Soldering Cans, of which the following is a description, reference being had to the accompanying drawings, forming a part hereof.

My invention relates to can soldering machines of that class in which a can bottom is soldered to a flanged can body the flanges of which have been previously coated with solder, by placing the can bottom in position and melting the solder to cause the two parts to be united, and the objects of the invention are, to provide a machine capable of treating a large number of cans simultaneously which will hold the can body and bottom in proper relation to each other during the heating to melt the solder and during the cooling and in which the heat may be applied uniformly to the joint and the cooling may be rapidly effected.

With these and other objects as hereinafter explained in view, my invention consists in the construction and combination of elements hereinafter described and particularly pointed out in the claims.

Figure 1:
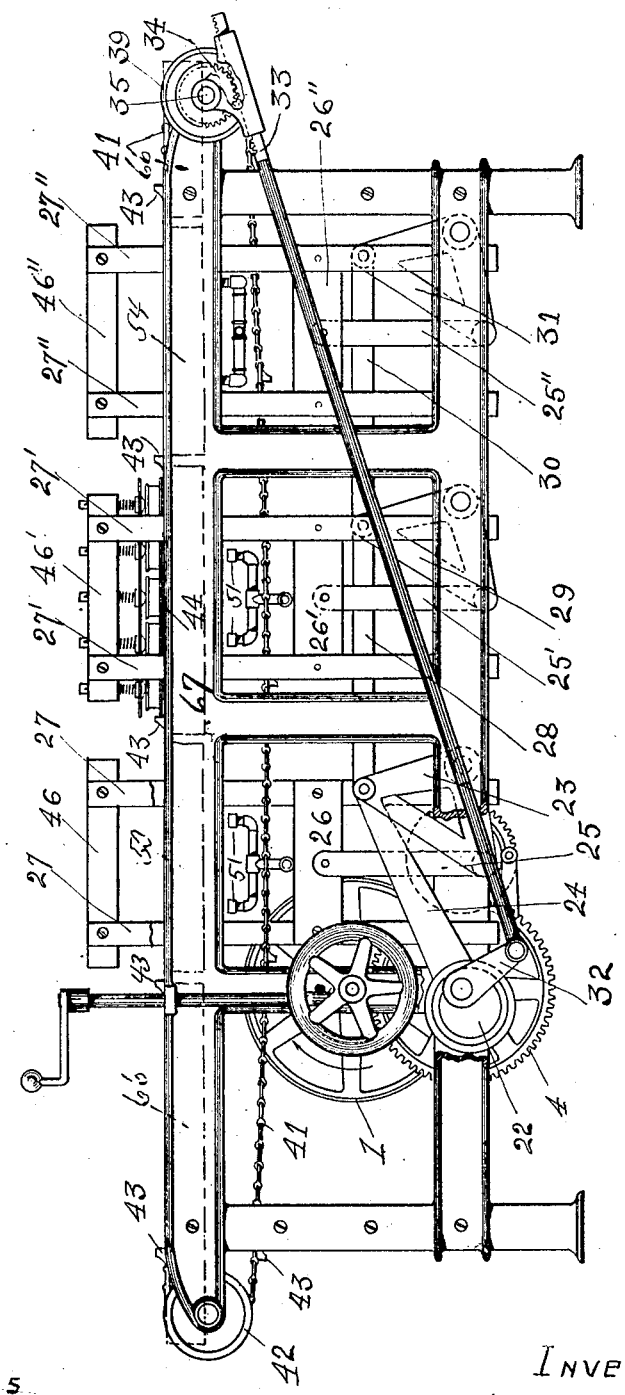
Figure 5:
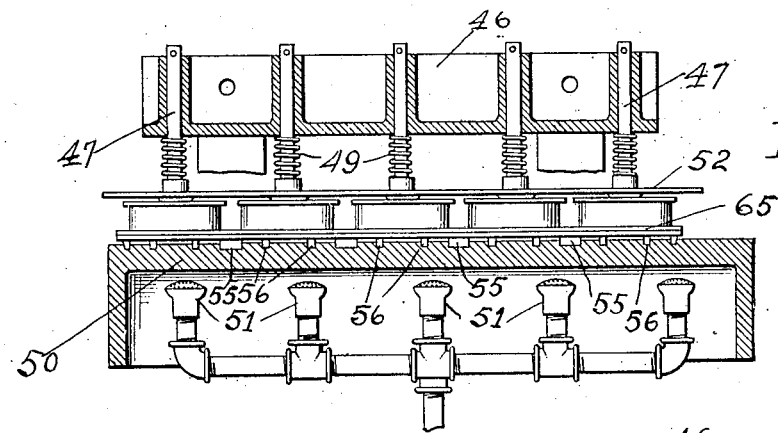
Figure 6:
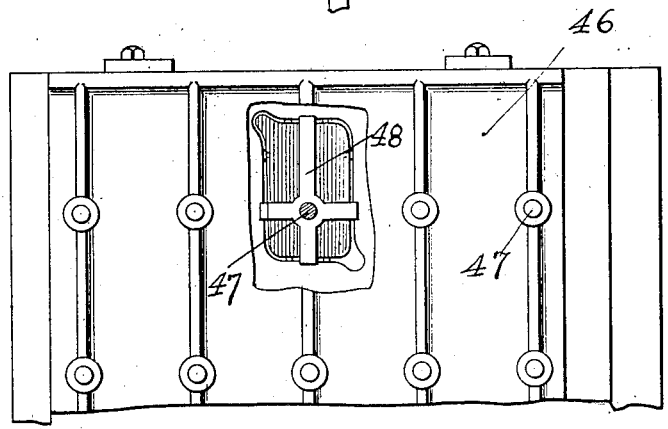
Figure 7:
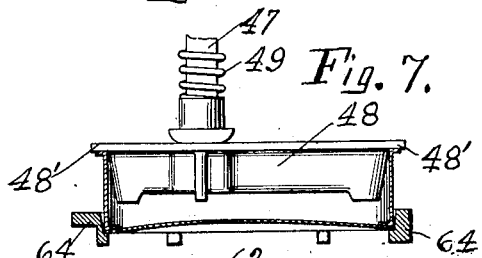
Figure 11:
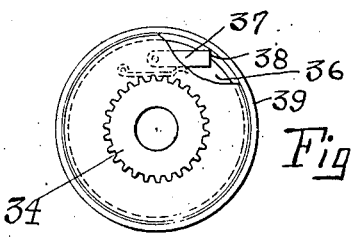
Figure 8:
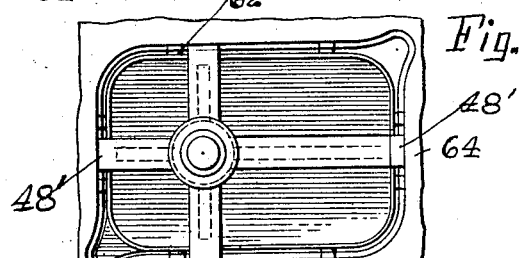
Figure 12:
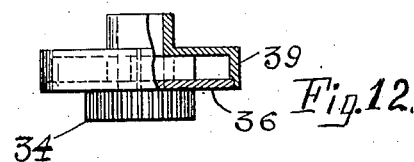

In the drawings, Figure 1 is a side elevation of a machine embodying my invention; Fig. 2 is a top or plan view partly broken away; Fig. 3 is a detail view on an enlarged scale showing the driving gear in elevation; Fig. 4 is a bottom plan view of the gearing shown in Fig. 3; Fig. 5 is a cross sectional view through the heating plate; Fig. 6 is a plan view of the portion of the machine shown in Fig. 5; Fig. 7 shows in vertical section and Fig. 8 in plan view one of the forms for holding the can with a can in position; Fig. 9 is a plan view of a portion of one of the groups of forms or trays for receiving and supporting the cans during the process of soldering; Fig. 10 is a cross sectional view on line 10—10 of Fig. 9; Figs. 11 and 12 are detail views of the ratchet feed device.

The machine shown is of the general type in which by means of endless chains or the like trays or carriers holding the cans to be soldered are caused to travel from one end of the machine to the other successively over heating devices by which the solder is melted and cooling devices by which they are cooled to cause the solder to set.

Referring particularly to the means for effecting suitable movement of the trays or carriers, 1 is a driving pulley on the main shaft 2 suitably mounted in the frame of the machine. The shaft 2 is provided with a pinion 3 engaging a gear 4 which is loose on a shaft 5 below and parallel with shaft 2. Gear 4 is provided on one side with a ring 6 having on its interior a notch 7 and the shaft 5 is provided with a collar 9 on which is pivoted a pawl 8 adapted to engage the notch 7 of the ring 6. Spring 10 serves to press the end of the pawl 8 outward to cause it to engage the notch 7.

11 is a sprocket gear on shaft 5 arranged to be rotated with the gear 4, and 12 is a similar sprocket gear on a short shaft or stud 13. Sprocket chain 14 connects the gears 11 and 12. To the hub of sprocket gear 12 is secured a pinion 15 engaging a gear 16 on a short shaft or stud 17. The ratio of gear 16 to pinion 15 is 4 to 1. On the side of gear 16 is a cam 18 adapted to act upon a roller 19 on one end of a lever 20 pivoted on stud 21. The cam 18 is so formed as shown in Fig. 3 that it will hold the lever 20 in the position in which it is shown in dotted lines in that figure during three revolutions of the gear 4 and permit it to remain in the position in which it is shown in full lines in that figure during one revolution of the gear 4.

The end of lever 20 opposite the end carrying roller 19 is so located that when elevated by the action of cam 18 on the roller 19, it will raise the end of pawl 8 out of engagement with the notch 7, the pawl 8 being of such width as to project beyond the ring 6 so as to be struck by the end of lever 20.

Gear 4 being in constant engagement with pinion 3, will rotate continuously, rotating with it the sprocket gear 11 and also rotating with it shaft 5 so long as the pawl 8 is in the notch 7. When the pawl 8 is lifted out of engagement with notch 7, the gear will rotate without rotating the shaft 5 until the pawl is again permitted to drop into engagement with the notch.

On shaft 5 at opposite sides of the machine are secured a pair of eccentrics 22 in alinement, each connected by an eccentric rod 24 with a bell crank lever 23, which is connected by a link 25 with a vertically movable cross head 26 which is connected by vertical rods 27 with a pressure plate 46. The bell crank levers 23, eccentric rods 24, links 25, cross heads 26 and vertical rods are in pairs corresponding to the two eccentrics. Links 18 connect the bell crank levers 23 with a second pair of bell crank levers 29 which are connected by links 25′ to a second pair of cross heads 26′ which are connected by vertical rods 27′ with a second pressure plate 46′. Bell crank levers 29 are connected by links 30 with a third pair of bell crank levers 31 which are connected by links 25″ to a third pair of cross heads 26″ which are connected by vertical rods 27″ with a third pressure plate 46″

32 is a crank on the end of shaft 5 having its crank pin connected to one end of a rack bar 33 having the rack at its free end in engagement with a pinion 34 which is loose on a shaft 35 mounted in the upper portion of the frame of the machine. The pinion 34 is provided with an annular flange 36 carrying a pawl 37 which is adapted to engage a notch 38 in the inner periphery of a ring 39 which is fast on shaft 35. The shaft 35 is provided with a pair of sprocket wheels 40, one at each side of the machine, each engaging one of a pair of endless chains 41 which pass respectively over one of a pair of idle wheels 42 suitably supported at the end of the machine opposite that at which shaft 35 is located. The chains are provided at suitable intervals with projections 43 for engaging the trays or carriers in which the cans to be soldered are placed. The successive projections 43 are preferably a distance apart equal to the distance which the chains are advanced by one revolution of the shaft 5.

44 indicates a tray or carrier for the cans. The tray is preferably made up of a series of strips 45 each having formed therein a series of openings 60 of a form adapted to receive the can bottom and can body preferably having at two diagonally opposite corners extensions adapted to receive the projecting tang or toe usual on the tops of sardine cans. The bars 61 intermediate the openings 60 are provided with inwardly extending toes or projections 62 adapted to support the can bottom (or top). These toes or projections are sufficiently below the level of the top of the strips 45 so that the walls 63 of the openings will hold the can body in proper position relative to the can bottom. The side rails 64 of the strips and the toes or projections 62 extend somewhat below the level of the under face of the bars 61. The strips 45 are secured together to form a tray or carrier by cross bars 65. For convenience, each tray or carrier is made up of five strips 45 each having therein five openings 60. The number of strips and the number of openings in each strip may, however, be varied as may be found desirable. The trays or carriers are adapted to be carried by the chains 41 from one end of the machine to the other, being engaged by the projections 43.

46, 46′ and 46″ are pressure plates each carrying a series of vertically arranged spindles 47 corresponding in number with the number of openings 60 in the tray or carrier 44 and each provided at its lower end with a cross shaped foot 48 adapted to enter the can body and having a flange 48′ adapted to rest upon the upper edge of the can body. The spindles 47 with their feet 48 are pressed downward by springs 49.

50 is a hot plate for melting the solder with which the flanges of the can bodies are coated before they are placed in the openings 60 of the trays or carriers. The hot plate is heated by means of burners 51 placed beneath it.

52 is a baffle plate or shield plate for the purpose of protecting the springs 49 from the heat radiated from the hot plate. A second hot plate preferably heated in the same way as the hot plate 50 is located beneath the pressure plate 46′ and is hidden thereby. 54 is a cold plate similar in construction to the hot plate 50, but instead of having burners beneath it is provided with any convenient means for keeping it at a sufficiently low temperature to insure the setting of the solder quickly, such for instance as a system of water circulation (not shown).

The hot plates and the cold plate are each provided with grooves 55, 56, running lengthwise of the machine adapted to receive the downwardly projecting portions of the side rails 64 and the toes or projections 62.

66 are supports extending beyond the plates 50 and 54, and supported from the frame of the machine. The location of these supports is such that the upper surface thereof will be in line with the upper surface of the plates 50 and 54, above mentioned. The supports 66 appearing at the left of Fig. 2 are for the purpose of receiving the trays or carriers, with cans therein, from which supports the trays and cans are carried by the sprocket chain across the heated and the cooled plates. The supports 66 at the right of Fig. 2 are for the purpose of receiving the trays or carriers after they have passed through the machine.

The upper surfaces of the supports 66, hot plate 50, the second hot plate beneath the pressure plate 46′, and the cold plate 54, all lie in a single plane corresponding approximately with the plane of the upper edge of the frame whereby the various members of the machine are supported. These elements are hidden by the upper members 67 of the frame, but their position is indicated by dotted lines in Fig. 1 of the drawings.

In the operation of the machine, a tray or carrier having in each of its openings 60 a can bottom supported on the tangs, or toes 62 and having in each opening a can body with its flange previously coated with solder resting on the can bottom as shown in Fig. 7, is placed on supports 66 at the right of the machine and in position to be engaged by the projections 43 on the chains 41, and the machine is started in any convenient way, as by clutching the driving pulley 1 to the shaft 2. As the shaft rotates, pinion 3 causes gear 4 to rotate which, the pawl 8 being in engagement with notch 7, causes shaft 5 to be rotated. As the shaft rotates carrying with it crank 32, the rack bar 33 operates the pinion 34 to rotate shaft 35 causing the chains 41 to draw the tray or carrier forward over hot plate 50 and under pressure plate 46. As the chains cease their movement as the rack bar 33 begins to move in opposite direction causing the pawl 37 to be disengaged from notch 38, the eccentrics 22 operate by the further rotation of shaft 5 to cause the pressure plate 46 to descend, the feet 48 to enter the can bodies and through their flanges 48' to press the can bodies yieldingly downward upon the can bottoms which rest upon the tangs or toes 62. The grooves 55, 56 in the hot plate being of such depth as to permit the can bottoms to rest directly upon the hot plate 50, the plate acts quickly upon the solder to melt it. As the eccentrics act to bring down the pressure plate, the cam 18 acts upon the lever 20 to lift the pawl 8 out of notch 7 and the shaft 5 thereupon stops until the gear 4 has completed three revolutions when the cut away portion of the cam 18 again comes opposite the end of the lever 20 permitting it to rise, releasing the pawl 8 which reëngages the notch 7 and the shaft 5 begins again to rotate. The first effect of this renewed movement of the shaft 5, through the eccentrics 22, lifts the pressure plate and then through the crank 32 causes the shaft 35 to rotate to draw the chains 41 forward advancing the carrier with its cans quickly from hot plate 50 to hot plate 53, and then as before described causes the pressure plate 46' to descend. During the interval between the raising of pressure plate 46 and the descent of pressure plate 46' the cans are relieved of pressure permitting the melted solder to distribute itself between the flange of the can body and the can bottom. After the tray or carrier has remained on the second hot plate during three revolutions of the gear 4, the shaft 5 is again operated as before to cause the pressure plate 46' to be lifted and the carrier advanced to cold plate 54 and to bring down pressure plate 46''. After gear 4 has again completed three revolutions, shaft 5 is again operated raising pressure plate 46'' and carrying the tray or carrier with its now completely soldered can forward where it may be removed from the chains.

Of course as soon as one tray or carrier is carried onto hot plate 50, a second tray or carrier is placed in position so that after the machine is once started one tray is on the cold plate and two others are under the first and second hot plates respectively during three revolutions of the gear 4.

The movement of the trays or carriers from one plate to another takes place quickly and a relatively long period is allowed for the cans to rest on the plates, the movement being effected in one third the time allowed for the resting of the cans on the plate. The actual time taken either in the movement of the trays or in the heating or cooling of the cans is very short and the cans may be soldered very rapidly.

While the part soldered to the can body as above described has been termed the bottom and serves as such during the filling of the can, it is in fact in the filled can, the top being the part which is removed in opening the can.

I find that the tangs or toes 62 afford sufficient support for the can bottom and at the same time are not of sufficient area to prevent the melting of the solder throughout the full extent of the flange of the can body. By providing grooves in the hot plates to receive these tangs or toes the can bottom is brought directly in contact with the hot plate by which the solder is more quickly and evenly melted than where a separate support for the cans is used or where the cans are heated by the direct action of flame.

While my invention is herein shown embodied in a machine designed for soldering rectangular cans such as the ordinary sardine cans, it will of course be understood that it may be used in the soldering of cans of any other form as well.

Having thus described my invention, what I claim and desire to secure by Letters Patent, is:—

1. In an apparatus for soldering cans, a stationary heated plate; a tray or carrier having an opening adapted to receive a can body and bottom to be soldered together; means for supporting the can in said opening; means for supporting said carrier in a position such that the can bottom is in the plane of the surface of said plate; and means for moving said carrier from said support and across said plate, whereby as the carrier traverses the heated plate the can bottom moves in direct contact therewith.

2. In an apparatus for soldering cans, a stationary heated plate; a tray or carrier having an opening adapted to receive a can bottom with a can body resting thereupon; means for supporting the can bottom within said opening; means for supporting said carrier in a position such that the can bottom is in the plane of the surface of said plate; and means for moving said carrier from said support and across said plate, whereby as the carrier traverses the heated plate the can bottom moves in direct contact therewith.

3. In an apparatus for soldering cans, a stationary heated plate having longitudinally extending grooves; a tray or carrier having an opening adapted to receive a can bottom with a can body resting thereupon, and having means extending beneath and forming a support for the bottom; means for supporting said carrier in a position such that the can bottom is in the plane of the surface of said plate; and means for moving said carrier from said support and across said plate, the arrangement of the parts being such that the supports for the can bottom pass through said grooves as the carrier traverses the heated plate and the can bottom moves in direct contact therewith.

4. In an apparatus for soldering cans the combination with a heated plate and a cool plate of means for moving can bottoms and can bodies onto the heated plate and from the heated plate onto the cool plate, so arranged that the can bottom will be supported in direct contact with said plates throughout substantially its entire area, means for pressing the parts to be soldered together and against the heated plate, and a second means for pressing said parts together and against the cool plate.

5. In an apparatus for soldering cans, the combination with a stationary heated plate, of intermittently moving means for receiving and supporting cans to be soldered and for moving said cans onto the heated plate, permitting them to rest upon the plate to cause the solder to be melted, and then moving them off the plate, said moving means being arranged to so support the cans that the can bottoms will be in direct contact with the heated plate.

6. In an apparatus for soldering cans, the combination with a stationary heated plate, of intermittently moving means for moving the cans to be soldered onto the heated plate, permitting them to rest upon the plate to cause the solder to be melted, and then moving them off the plate, said moving means being arranged to so support the cans that the can bottoms will be in direct contact with the heated plate, and means for pressing the parts to be soldered together and against the heated plate.

7. In an apparatus for soldering cans, the combination with a stationary heated plate, of intermittently moving means for moving the cans to be soldered onto the heated plate, permitting them to rest upon the plate to cause the solder to be melted, and then moving them off the plate, said moving means being arranged to so support the cans that the can bottoms will be in direct contact with the heated plate, and means for pressing the parts to be soldered together and against the heated plate timed to operate while the cans are held on the heated plate and to relieve the cans from pressure during their movement onto and off the heated plate.

8. In an apparatus for soldering cans, the combination with a stationary heated plate provided with grooves, of means for moving the cans to be soldered onto and off from the heated plate and for supporting the can bottom in direct contact with the heated plate, said supporting means extending into the grooves in the heated plate.

9. In an apparatus for soldering cans, the combination with a stationary heated plate provided with grooves, of means for moving the cans to be soldered onto and off from the heated plate and for supporting the can bottom in direct contact with the heated plate, said supporting means extending into the grooves in the heated plate, and means for pressing the parts to be soldered together and against the heated plate.

10. In an apparatus for soldering cans, the combination of a stationary horizontally arranged heated plate, means for moving cans over the heated plate arranged to successively move them onto the heated plate, permit them to rest upon the heated plate without movement, and to move them off the heated plate, a vertically movable pressure device, and means for operating said pressure device to press the cans against the heated plate while they rest thereon without movement, and to release the cans when they are to be moved off the heated plate.

11. In an apparatus for soldering cans, the combination of a tray or carrier having an opening adapted to receive a can bottom and can body and having inwardly extending tangs or toes adapted to support the can bottom, a stationary heated surface, and means for moving the tray or carrier over the heated surface.

12. In an apparatus for soldering cans, the combination of a tray or carrier having an opening adapted to receive a can bottom and can body and having inwardly extending tangs or toes adapted to support the can bottom, a stationary heated surface, a pressure device above the heated plate adapted to hold the can bodies onto the can bottoms, and means for moving the tray or carrier over the heated surface.

13. In an apparatus for soldering cans, the combination of a tray or carrier having an opening adapted to receive a can bottom and can body and having inwardly extending tangs or toes adapted to support the can bottom, a stationary heated surface, a vertically movable pressure device above the heated plate and adapted to press the can bodies onto the can bottoms, means for depressing and raising the pressure device, and means for moving the tray or carrier over the heated surface, in a series of step by step movements.

14. In an apparatus for soldering cans, the combination of a tray or carrier having an opening therein adapted to receive a can bottom and can body, supports for the can bottom and can body extending below the lower face of the tray or carrier, and a stationary heated plate provided with grooves to receive the supports, the arrangement of the parts being such that the supports enter the grooves thereby permitting the can bottom to rest directly upon the heated plate.

15. In an apparatus for soldering cans, the combination of a tray or carrier having an opening therein adapted to receive a can bottom and can body, supports for the can bottom and can body extending below the lower face of the tray or carrier, a stationary heated plate provided with grooves to receive the supports, the arrangement of the parts being such that the supports move in the grooves and the can bottom rests directly upon the heated plate as the carrier moves thereover, and means for moving the carrier across the heated plate.

16. In an apparatus for soldering cans, the combination of a tray or carrier having an opening therein adapted to receive a can bottom and can body, supports for the can body extending below the lower face of the tray or carrier, a stationary heated plate for melting the solder on the can body, and a stationary cool plate located in alinement with said heated plate for causing the melted solder to set, both said plates being provided with grooves to receive said supports, the arrangement of the parts being such that the supports move in the grooves and the can bottom rests directly upon the heated plates and the cool plate as the carrier moves thereover, and means for moving the carrier across the said plates.

17. In an apparatus for soldering cans having heating means for melting the solder, a tray or carrier for the cans to be soldered comprising a plurality of strips, each of the strips being provided with openings to receive the cans and with projecting toes to prevent the cans from passing through said opening, and means for securing said strips together.

18. In an apparatus for soldering cans, a first heated plate, a second heated plate and a cool plate, intermittently moving means for moving the cans successively to the heated plates and cool plate arranged to hold the cans on said plates successively without movement for an appreciable period of time and means for pressing together the parts to be soldered, arranged to operate while the cans are held without movement and to relieve the cans from pressure during their movement from one plate to another.

19. In an apparatus for soldering cans, two heated plates, means for moving cans to be soldered onto the first heated plate and from said plate to the second heated plate, a pressure device and means for operating it to press the parts to be soldered together and against the first heated plate, means for raising the pressure device to relieve the cans from pressure and permit the cans to be advanced to the second heated plate, a second pressure device and means for operating it to again press the parts to be soldered together and against the second heated plate.

This specification signed and witnessed this seventeenth day of September A. D. 1906.

CHARLES W. SLEEPER.

In the presence of—
　Geo. N. Kent,
　Nellie L. Goodale.